United States Patent [19]

Schraut et al.

[11] Patent Number: 4,591,040
[45] Date of Patent: May 27, 1986

[54] CLUTCH DISC FOR A MOTOR VEHICLE FRICTION CLUTCH

[75] Inventors: Alfred Schraut, Waigolshausen; Helmuth Weissenberger, Theilheim, both of Fed. Rep. of Germany

[73] Assignee: Fichtel & Sachs AG, Schweinfurt, Fed. Rep. of Germany

[21] Appl. No.: 511,670

[22] Filed: Jul. 7, 1983

[30] Foreign Application Priority Data

Jul. 20, 1982 [DE] Fed. Rep. of Germany ....... 3227004

[51] Int. Cl.$^4$ ............................................. F16D 23/10
[52] U.S. Cl. .............................. 192/106.2; 192/70.17; 464/68
[58] Field of Search ............... 192/106.1, 106.2, 70.17; 464/68

[56] References Cited

U.S. PATENT DOCUMENTS

| | | | |
|---|---|---|---|
| 3,428,155 | 2/1969 | Binder et al. ...................... | 192/106.2 |
| 3,534,841 | 10/1970 | Schneider et al. ................ | 192/106.2 |
| 4,122,931 | 10/1978 | Maucher .......................... | 192/106.2 |
| 4,368,812 | 1/1983 | Steeg ................................. | 192/106.2 |
| 4,478,326 | 10/1984 | Rotter ............................... | 192/106.2 |

FOREIGN PATENT DOCUMENTS

| | | |
|---|---|---|
| 1840780 | 8/1961 | Fed. Rep. of Germany . |
| 1261064 | 4/1969 | United Kingdom . |
| 1385304 | 2/1972 | United Kingdom . |
| 2109085 | 11/1982 | United Kingdom . |

Primary Examiner—Ronald C. Capossela
Attorney, Agent, or Firm—Toren, McGeady, Stanger, Goldberg & Kiel

[57] ABSTRACT

The invention relates to a clutch disc with vibration damper, in which a driven plate carrying the friction linings is arranged between two cover plates firmly connected with the hub. Friction rings are arranged between the driven plate and the cover plates. The axial force generation for the achievement of a friction force is effected through externally situated leaf springs which extend radially between individual helical springs. The leaf springs are riveted fast at their radially inner ends with the hub and with their outer ends they press through distance pieces upon a presser plate which is situated between the one cover plate and the one of the friction rings. The presser plate is arranged fast in rotation but axially displaceably in relation to the pertinent cover plate. Tabs bent off axially on the external circumference of the presser plate here engage in corresponding recesses of the cover plate. Especially with regard to heavy working in freight vehicle clutches thus the presser plate is loaded only with the transmission of the friction force, and in combination with the preferably three axially protruding tabs the production of the presser plate is simple, likewise uniform distribution of the torque to all three tabs is guaranteed. Thus at this point too, the wear is reduced to a minimum.

11 Claims, 6 Drawing Figures

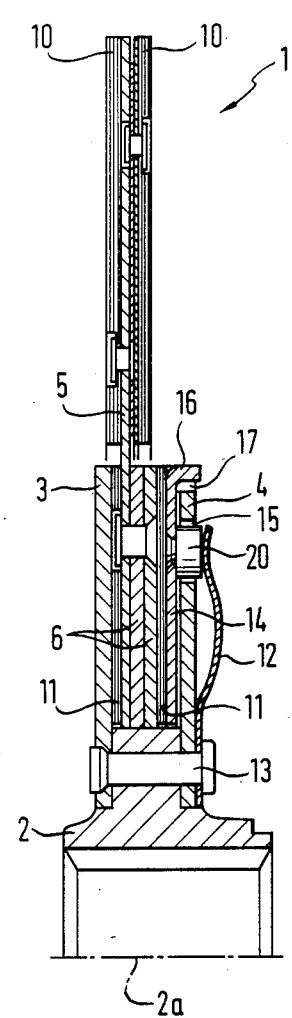
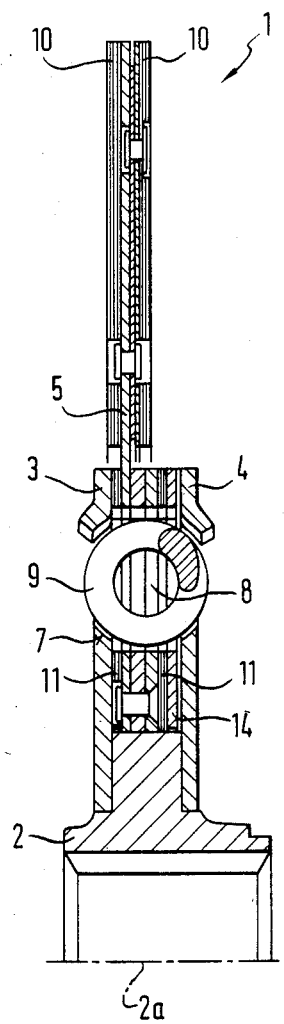

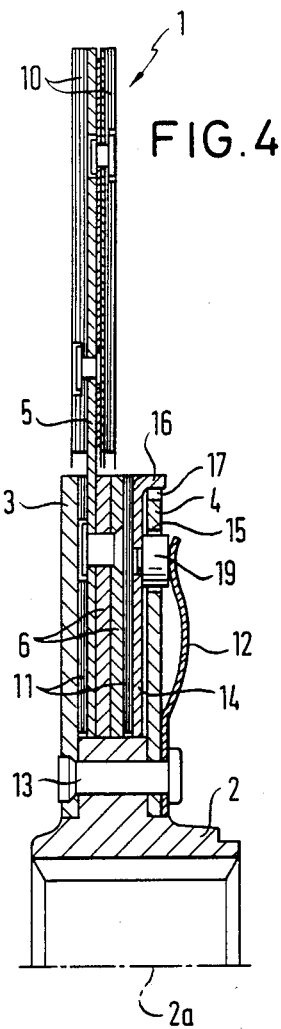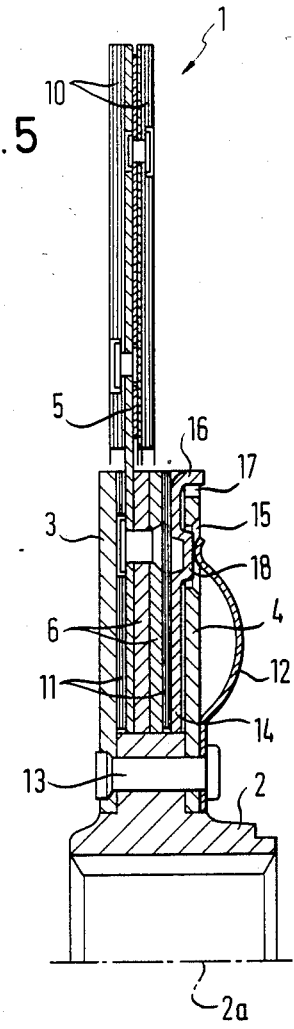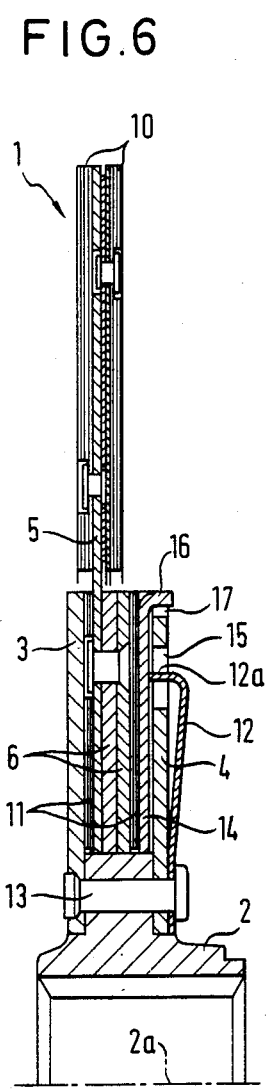

4,591,040

CLUTCH DISC FOR A MOTOR VEHICLE FRICTION CLUTCH

BACKGROUND OF THE INVENTION

The invention relates to a clutch disc with torsional vibration damper for friction clutches of motor vehicles.

STATEMENT OF PRIOR ART

From German Utility Model No. 1,840,780 a clutch disc with torsional vibration damper is known which comprises a hub, two cover plates arranged to both sides of the hub and connected fast in rotation therewith, and a driven plate mounted rotatably between the cover plates with friction linings arranged to both sides of the driven plate.

Damping springs which are stressable in relative rotation are arranged in windows of the driven plate and of the cover plates. Between the cover plates and the driven plate there are arranged friction rings which are initially axially stressed, to generate a friction force, by leaf springs arranged in somewhat star form outside the cover plates.

In this know clutch disc one of the cover plates is fixed on the hub, while the other cover plate is guided fast in rotation but axially displaceably on the hub. For this purpose noses are fitted on the hub and engage in complementary milled recesses of this cover plate. More especially in use in heavily stressed freight vehicle friction clutches, the axial displacement of the cover plate caused by the wear of the friction rings is made more difficult by the fact that it has to transmit not only the friction force of the friction device but also a part of the torque. The milled recesses of the cover plate are expensive to produce and frequently not sufficiently durable.

OBJECT OF THE INVENTION

An object of the present invention is to provide a clutch disc of relatively simple design with a friction damping device, which is simple to produce, achieves a long life and generates the most constant possible friction force over the whole life.

SUMMARY OF THE INVENTION

According to the invention the two cover plates, for the better transmission of the torque, are connected fast, especially riveted, with the hub. Likewise the springs, preferably formed as leaf springs, can be connected fast with the hub on the outside of the one cover plate by means of the rivets. The task of friction force generation and transmission of the friction force is taken over by a presser plate which is arranged between the one friction ring and the inner side of the one cover plate. The presser plate and its parts for rotation-fast connection with the cover plate are thus loaded only by the friction force and can therefore be produced more simply, with the same life.

The rotation-fast connection between presser plate and cover plate preferably takes place through several, especially three, axially bent-over tabs arranged on the external circumference of the presser plate, which engage in corresponding recesses on the external circumference of the cover plate. The production of the presser plate is simplified by the arrangment of preferaly three of these axially bent-over tabs. In the normally necessary hardening of the presser plate the latter can warp. This has an only inappreciable effect, in the case of only three tabs, upon the uniform torque supporting of all the tabs. Moreover the torque transmission on the radially outer circumference involves correspondingly low forces.

The formation of the leaf springs is simplified by arrangement of distance pieces between the presser plate and the outer side of the cover plate. These distance pieces can be provided as separate components, they can be connected fast with the presser plate or can be a part of this presser plate. Moreover it is also possible to transmit a part of all of the friction moment through these distance pieces.

BRIEF DESCRIPTION OF DRAWINGS

The invention will next be explained in greater detail by reference to several examples of embodiment:

FIG. 2 shows a section along the line II—II through this clutch disc;

FIG. 3 shows the section along the line III—III at another point through the same clutch disc;

FIG. 4 shows a section through a clutch disc of different formation;

FIGS. 5 and 6 show sections through further variants of clutch discs.

DESCRIPTION OF PREFERRED EMBODIMENT(S)

Figure 1:
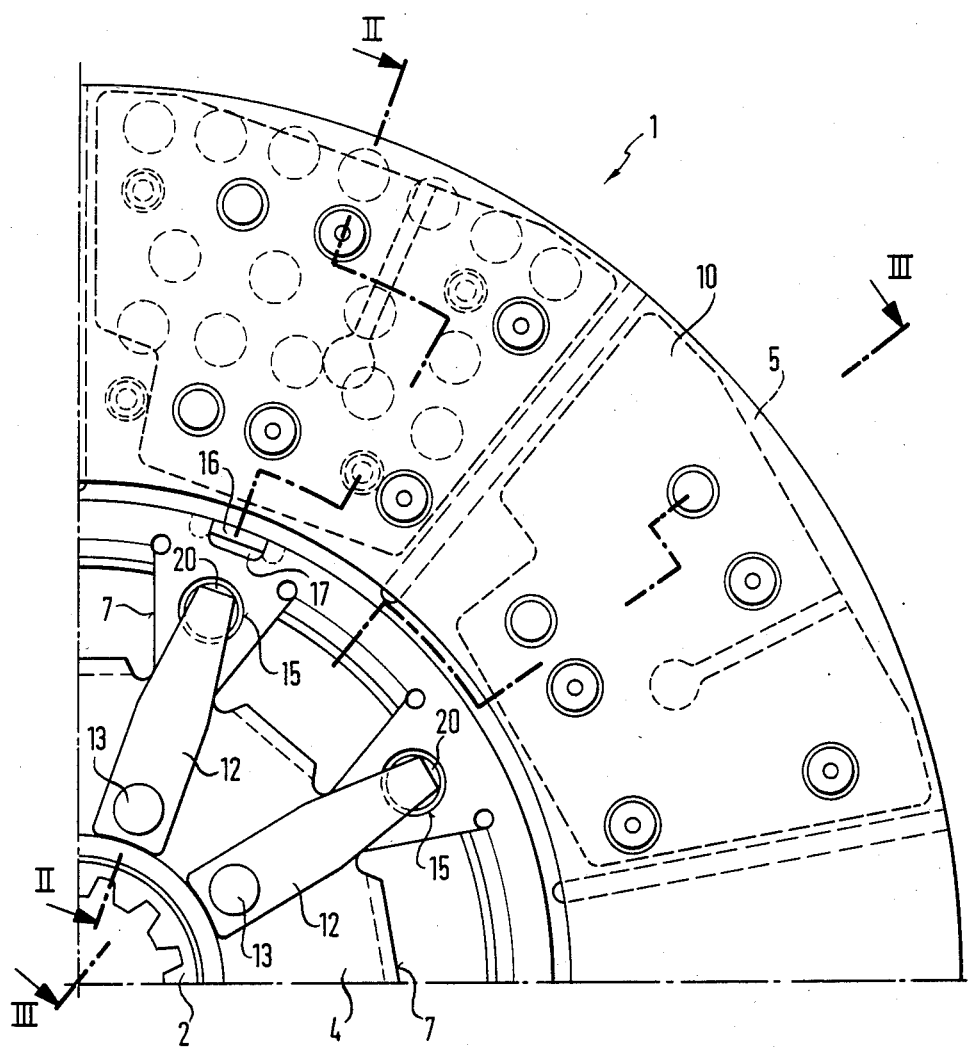
FIG. 1 shows the partial view of a clutch disc with friction damper.

FIGS. 1 to 3 represent a partial view and partial sections of a clutch disc 1. It is composed of a hub 2 which is arranged fast in rotation but axially displaceably on a gear shaft (not shown) rotating about a rotation axis 2a. Cover plates 3 and 4 are fixed by means of rivets 13 to both sides of the hub 2. The cover plates 3 and 4 protrude radially beyond the external circumference of the hub 2. A driven plate 5, which is provided with reinforcing rings 6 in the region of the cover plates 3 and 4, reaches into the space enclosed by the two cover plates 3 and 4. A friction ring 11 is arranged between the driven plate 5 and the cover plate 3, and a second friction ring 11 is arranged between the reinforcing rings 6 and the cover plate 4. Furthermore a presser plate 14 is arranged between the second friction ring 11 and the cover plate 4. Radially ouside this friction device the driven plate 5 is provided with friction linings 10. The components 3, 4, 5, 6, 11, 14 are provided with corresponding windows 7 and 8 in which helical springs 9 are accommodated on a common mean circle. Between these helical springs 9—considered in a circumferential direction—there extend substantially radially extending leaf springs 12 which are clamped in at their radially inner ends between the rivets 13 and the outer side of the cover plates 4. With their radially outer ends they lie under initial stress upon distance pieces 20 which are for example riveted with the presser plate 14. They penetrate here through openings 15 in the cover plate 4. The presser plate 14 is connected fast in rotation but axially movably with the cover plate 4 by tabs 16 axially angled off at their radially outer ends, these noses or tabs 16 engaging in corresponding recesses 17 of the cover plate.

The function of the clutch disc with vibration damper is as follows:

In torque transmission between the friction linings 10 and the hub 2 of the clutch disc 1 a relative rotation takes place between these parts due to the yieldability of the helical springs 9. Here the driven plate 5 and the reinforcing rings 6 rotate in relation to the cover plates 3 and 4 and the presser plate 14, so that the friction rings 11 lying therebetween exert a friction force, due to the loading of the leaf springs 12, upon the relatively rotatable parts. The friction rings 11 can here be made fast by adhesion with the reinforcing rings 6 and/or the driven plate 5. The friction force is achieved by the leaf springs 12 which are clamped-in firmly on the hub 2 and seek, with an axial initial stress, to press the presser plate 14 away from the cover plate 4. With increasing wear of the friction rings 11 here the presser plate 14 must be pushed axially to follow and its distance from the cover plate 4 thus increases. The tabs 16 of the presser plate 14 are here loaded in the circumferential direction in relation to the recesses 7 of the cover plate 4 only by a part of the friction force which is generated by the friction rings 11 and the leaf springs 12. Thus no heavy loading occurs on the tabs 16, and correspondingly also no great wear. The distance pieces 20 are provided in order to keep the form of the leaf springs 12 and their fitting simple. Naturally it is possible to use these distance pieces 20 for the torque transmission between presser plate 14 and cover plate 4. However the more transmission elements are provided, the more difficult it is to cause all transmission elements to participate in the torque transmission. Then due to production tolerances and warping in hardening the danger exists that only some of these transmission elements may be in engagement.

FIGS. 4 and 5 show variants of embodiment of FIGS. 1 to 3. Here only the formation and/or arangement of the distance pieces 18 and 19, which are provided in place of the distance piece 20, are different. In FIG. 4 the distance pieces 19 are merely set loosely upon the presser plate 14, so that here they can transmit only the axial forces issuing from the leaf springs 12. According to FIG. 5 the distance pieces 18 are drawn out of the material of the presser plate 14 and thus form one unit with the latter. Here it is possible to use these distance pieces 18 not only for the transmission of the initial stress force of the leaf springs 12 but also for the transmission of the friction moment from the presser plate 14 to the cover plate 4. In all cases these distance pieces must possess such an axial extent that the radially outer ends of the leaf springs 12 can transmit their initial stress force to the presser plate 14 even at maximum possible wear of the friction rings 11.

In FIG. 6 there is represented a further variant in which the distance pieces as represented in FIGS. 1 to 5 have merely been omitted, without replacement. For this purpose the leaf springs 12 in this embodiment are bent away, in their radially outer region 12a, approximately at right angles in the direction towards the presser plate 14 and they lie directly on this presser plate 14. This embodiment has the lowest production expense. Otherwise the function and assembly of this clutch disc are in accordance with the other figures.

I claim:

1. A clutch disc for a motor vehicle friction clutch comprising:
    (a) a hub which defines a rotation axis;
    (b) two cover plates held axially fast on the hub and held fast in rotation on the hub with axial distance from one another;
    (c) a driven plate arranged between the cover plates and mounted rotatably through a limited angle of rotation in relation to the cover plates about the rotation axis but axially movably on the hub;
    (d) friction linings mounted on both sides of said driven plate and located radially outside the cover plates;
    (e) compression springs located in axially opposite windows of the driven plate and of the cover plates, said springs being stressable in relative rotation between the driven plate and the cover plates;
    (f) friction rings arranged between the driven plate and each of the two cover plates with said rings laterally enclosing the hub;
    (g) a spring device secured to the hub and arranged on the side of one of the cover plates remote from the driven plate, for generating a pressure application force initially stressing the friction rings axially against the driven plate;
    (h) a presser plate enclosing the hub in annular form arranged between the one cover plate adjacent the spring device and the friction ring adjacent said one cover plate, which presser plate is guided fast in rotation but axially displaceable on said one cover plate, and
    (i) pressure transmission elements axially displaceably arranged in openings provided in said one cover plate in the region of the presser plate which elements transmit axial spring forces of the spring device to the presser plate.

2. A clutch disc according to claim 1, including rivets for securing the cover plates to the hub, wherein said spring device comprises a plurality of substantially radially extending leaf springs which are fitted to the hub with their radially inner ends by means of said rivets.

3. A clutch disc according to claim 2, in that the leaf springs each engage between the compression springs which are adjacent in the circumferential direction.

4. A clutch disc according to claim 1, wherein the presser plate carries on its external circumference several tabs bent axially away from the driven plate and the adjacent one cover plate has recesses in which the tabs engage.

5. A clutch disc according to claim 4, wherein the presser plate carries three tabs.

6. A clutch disc according to claim 4, wherein the recesses are arranged on the external circumference of the cover plate.

7. A clutch disc according to claim 1, wherein the pressure transmission elements are held on the presser plate.

8. A clutch disc according to claim 7, wherein the pressure transmission elements are deep-drawn sections formed from the material of the presser plate.

9. A clutch disc according to claim 7, wherein the pressure transmission elements are so dimensioned in the axial direction of the rotation axis so that the pressure transmission elements transmit the friction torque from the presser plate to the one cover plate.

10. A clutch disc according to claim 1, wherein the pressure transmission elements are arranged, as parts separate from the spring device and the pressure plate, loosely in the openings of the one cover plate.

11. A clutch disc according to claim 1, wherein the pressure transmission elements are held on the spring device.

* * * * *